United States Patent
Bourcier et al.

(10) Patent No.: US 8,454,076 B2
(45) Date of Patent: Jun. 4, 2013

(54) COVER ASSEMBLY

(76) Inventors: Patrick Bourcier, Pontiac, MI (US);
Matt Roeder, Clarkston, MI (US)

( * ) Notice: Subject to any disclaimer, the term of this patent is extended or adjusted under 35 U.S.C. 154(b) by 267 days.

(21) Appl. No.: 12/917,115

(22) Filed: Nov. 1, 2010

(65) Prior Publication Data
US 2011/0101728 A1    May 5, 2011

Related U.S. Application Data

(60) Provisional application No. 61/257,305, filed on Nov. 2, 2009.

(51) Int. Cl.
*B60P 7/04* (2006.01)
(52) U.S. Cl.
USPC .................... 296/100.18; 296/105; 296/186.2
(58) Field of Classification Search
USPC ......... 296/159, 26.04, 186.2, 100.15, 100.16, 296/100.18, 104, 105, 109
See application file for complete search history.

(56) References Cited

U.S. PATENT DOCUMENTS

| | | | |
|---|---|---|---|
| 1,679,642 A * | 8/1928 | Walden .......................... | 296/105 |
| 2,565,746 A * | 8/1951 | Turner ........................... | 296/104 |
| 5,641,192 A | 6/1997 | Smith et al. | |
| 5,722,712 A | 3/1998 | Pollen | |
| 5,752,736 A | 5/1998 | Nodier | |
| 5,797,797 A * | 8/1998 | Parsons ........................ | 463/47.7 |
| D406,800 S | 3/1999 | Nece | |
| 6,488,329 B1 | 12/2002 | Smith | |
| 6,499,783 B1 | 12/2002 | Husted | |
| 6,616,212 B1 | 9/2003 | Bishop | |
| 6,932,412 B1 | 8/2005 | Paproski | |
| 6,942,279 B1 | 9/2005 | Hoover | |
| 7,021,694 B1 | 4/2006 | Roberts et al. | |
| 7,100,961 B2 * | 9/2006 | Moen et al. .............. | 296/100.18 |
| 2006/0012212 A1 * | 1/2006 | Moen et al. .............. | 296/100.18 |
| 2008/0088146 A1 | 4/2008 | Newman | |
| 2010/0194137 A1 * | 8/2010 | Kealy ....................... | 296/100.01 |

OTHER PUBLICATIONS

"Erichsen Marine Canvas", printed from the internet Sep. 19, 2012, but archived and published on the internet Jul. 7, 2002.*

* cited by examiner

*Primary Examiner* — Jason S Morrow
(74) *Attorney, Agent, or Firm* — The Weintraub Group, P.L.C.

(57) ABSTRACT

A cover assembly for enclosing a flatbed which generally comprises a support structure including a plurality of support assemblies. Each of the support assemblies has a pair of opposed support legs and a medial portion connected to and extending between each of the support legs. The length of the medial portion of each support assembly can be adjusted to allow the support structure to accommodate the widths of any number of industry-standard sized flatbeds. Each of the support legs can be secured to the flatbed, and at least one crossmember is connected to and extends between a first support assembly and a second support assembly from the plurality of support assemblies. A covering is also positioned over and secured to the support structure.

15 Claims, 6 Drawing Sheets

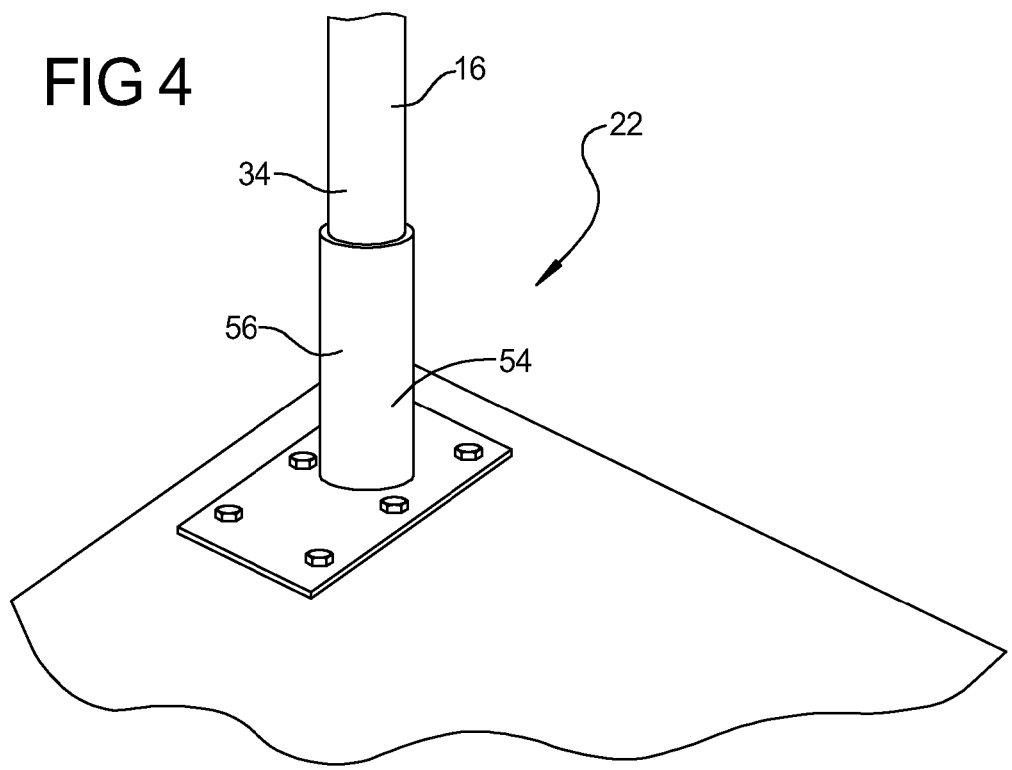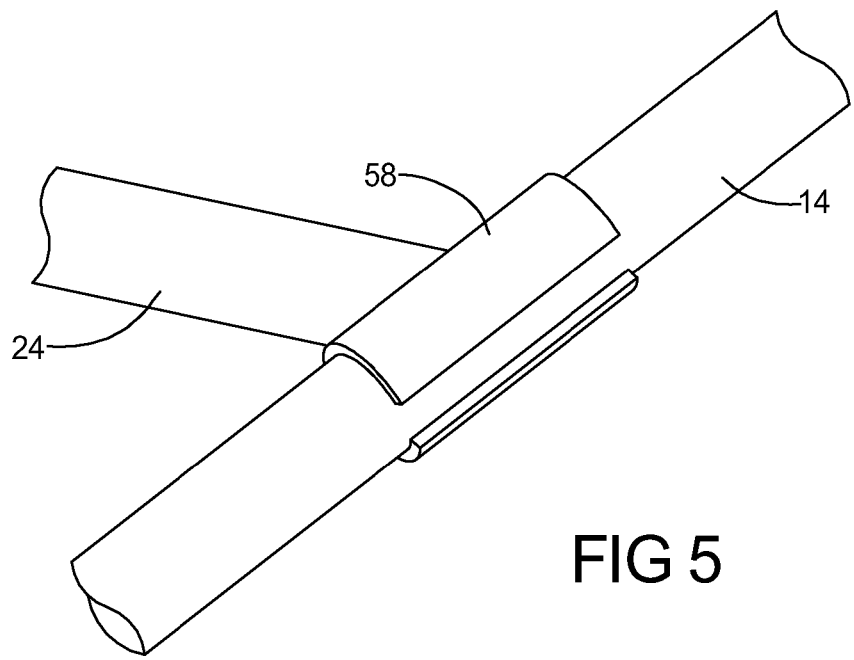

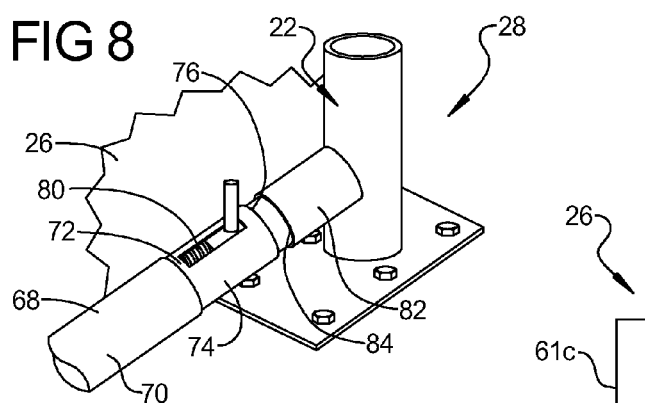
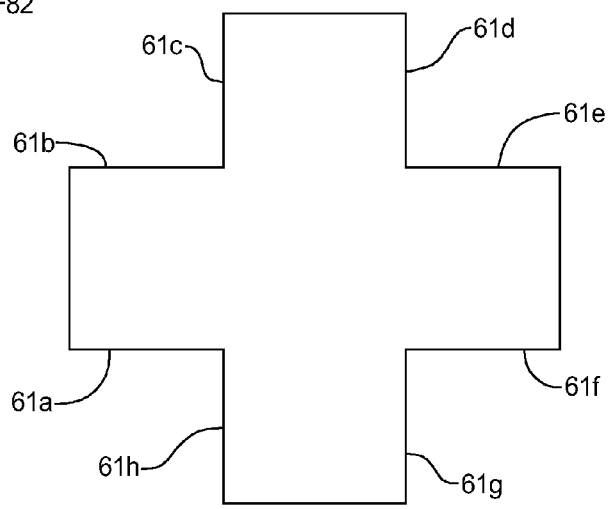
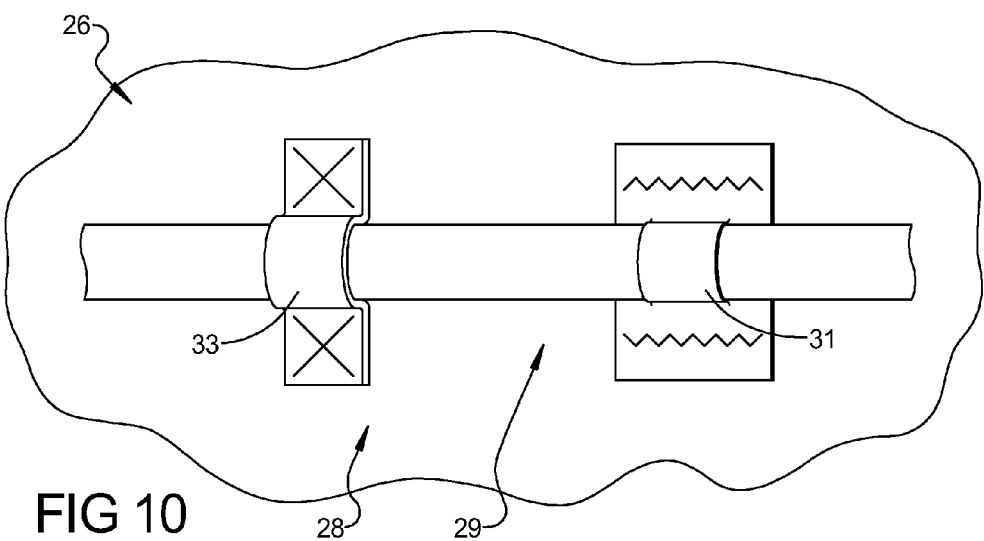

FIG 11
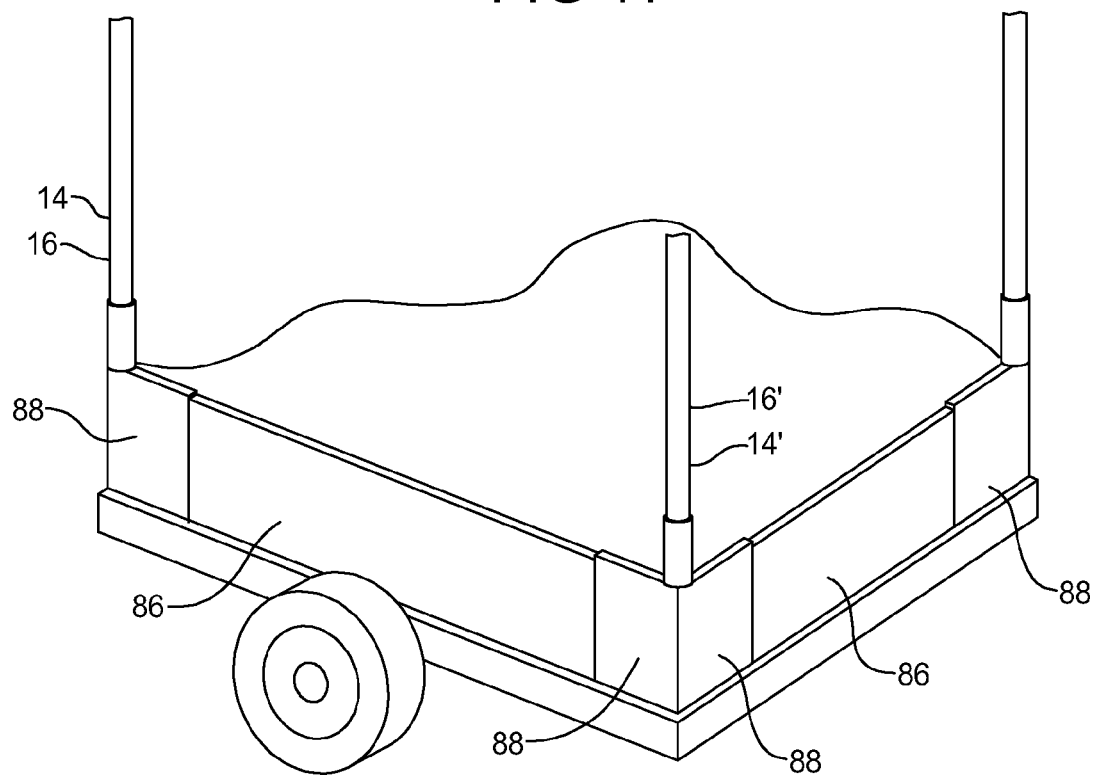
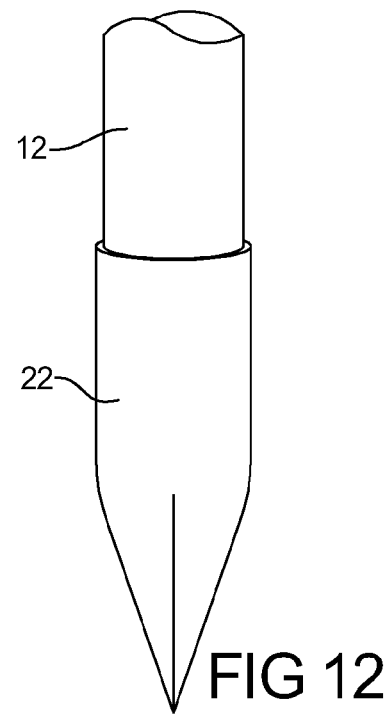
FIG 12

COVER ASSEMBLY

CROSS-REFERENCE TO RELATED APPLICATION

This application claims the benefit of U.S. Provisional Application 61/257,305 which was filed on Nov. 2, 2009, the entire disclosure of which is hereby incorporated by reference.

BACKGROUND OF THE INVENTION

1. Field of the Invention

The present invention pertains to a cover assembly for use with a flatbed. More particularly, the present invention pertains to a cover assembly comprising a support structure and a covering for use with a flatbed. Even more particularly, the present invention pertains to a cover assembly comprising a size-adjustable support structure and a covering for use with a flatbed.

2. Description of the Prior Art

Cover assemblies comprising a support structure and a covering for use with flatbeds are well-known in the art, such as disclosed in U.S. Pat. No. 6,616,212 to Bishop and U.S. Pat. No. 7,021,694 to Roberts et al. The cover assemblies disclosed by Bishop and Roberts are representative of the types of flatbed cover assemblies that are commonly available. Such flatbed cover assemblies generally include a support structure which comprises support members that are interconnected by joints, as well as a tarp which is secured over the support structure. When the cover assembly is intended for use as a temporary shelter, such as in Bishop and Roberts, the cover assembly typically includes a peaked roof and is usually designed for use on the open bed of a pickup truck.

Cover assemblies intended for mobile use with a flatbed are also well-known in the art, such as found in U.S. Pat. Nos. 5,641,192 and 6,488,329 to Smith. Both Smith patents disclose a cover assembly for mobile use with a utility trailer flatbed in which the cover assembly comprises a frame structure covered by a flexible material. Both Smith patents disclose at least a portion of the cover assembly which pivots open with respect to the flatbed. Items may be placed on the flatbed, and the cover assembly can then be pivotably enclosed over the items. The cover assemblies disclosed by the Smith patents require the user to lift a bulky portion of the cover assembly and retain the raised portion in place with a pole. The amount of overhead space is compromised, and it is difficult to load or unload items from the flatbed with the pole in place.

In addition, the flexible material covering used by cover assemblies found in the prior art is typically polyethylene tarpaulins, or tarps. Polyethylene tarps are an economical product best suited for stationary use to cover and protect items from the weather. Tarps such as these are prone to puncturing, ripping, and fraying, particularly around the grommets located along the edges. As such, these tarps are not well suited for exposure to high wind speeds which occurs while traveling along a highway. Therefore, a need remains for a covering material which is light and economical, yet is durable, weather-resistant, and is extremely tough and resistant to ripping or tearing.

Furthermore, flatbed utility trailers are available in a number of industry-standard sizes. For instance, utility trailers are commonly available in the following sizes: 5 feet wide by 8 feet long; 6 feet wide by 10 feet long; 7 feet wide by 10 feet long; 8 feet wide by 10 feet long; 7 feet wide by 12 feet long; 8 feet wide by 16 feet long; and so on. The support structures used by the cover assemblies disclosed in the prior art are each designed for use with a specific industry-standard size. That is, the support structures found in the prior art are not adjustable from one size of flatbed to another. For individuals who own more than one flatbed of varying size, it is beneficial to have a single support structure which can be used on each flatbed. In addition, it is desirable for cover assembly manufacturers to manufacture a single support structure which is adjustable for use with a variety of differently-sized flatbeds, and which can be sold as a kit.

Thus, there remains a need for a support structure for a cover assembly which is adjustable for use with a variety of industry-standard sizes of flatbeds.

The present invention, as is detailed hereinbelow, seeks to resolve these issues by providing a cover assembly comprising a size-adjustable support structure and a covering for use with a flatbed.

SUMMARY OF THE INVENTION

In a first embodiment hereof, the present invention provides a cover assembly for enclosing a flatbed which generally comprises:

(a) a support structure including a plurality of support assemblies, each of the support assemblies having a pair of opposed support legs and a medial portion connected to and extending between each of the support legs, the medial portion of each support assembly including means for adjusting the length of the medial portion;

(b) means for securing each of the support legs to the flatbed;

(c) at least one cross-member connected to and extending between a first support assembly and a second support assembly from the plurality of support assemblies;

(d) a covering positioned over the support structure; and (e) means for securing the covering to the support structure.

For a more complete understanding of the present invention, reference is made to the following detailed description and accompanying drawings. In the drawings, like reference characters refer to like parts throughout the views in which:

BRIEF DESCRIPTION OF THE DRAWINGS

FIG. 4 is a perspective view of an exemplary embodiment of the means for securing each of the support legs to the flatbed;

FIG. 5 is an enlarged view of an exemplary embodiment of the means for securement of a cross-member to one of the support assemblies from the plurality of support assemblies;

FIG. 8 is an enlarged view showing an exemplary embodiment of the means for securing the covering over the support structure;

FIG. 9 is a plan view of the covering laid out flat;

FIG. 10 is an enlarged view showing the means for securing the covering to the support structure;

FIG. 11 shows a perspective view of the invention comprising a plurality of boards secured about the perimeter of the flatbed; and FIG. 12 shows an enlarged view of the means for securing the support structure wherein the means for securing is a ground stake for use on the ground.

DETAILED DESCRIPTION OF THE PREFERRED EMBODIMENT

At the outset it is to be noted that the ensuing disclosure is made with reference to a cover assembly for enclosing a flatbed. As contemplated herein, the flatbed can comprise any suitable open surface regardless of whether it is flat (such as on a pickup truck which may include wheel wells projecting into the bed). The flatbed is not so limited to the open bed of a truck, but it can include an open surface on a utility trailer, a semi trailer, a ship, a train car, a stationary surface (e.g., the ground), or any other open surface which would be appreciated by one of ordinary skill in the art.

Figure 1:
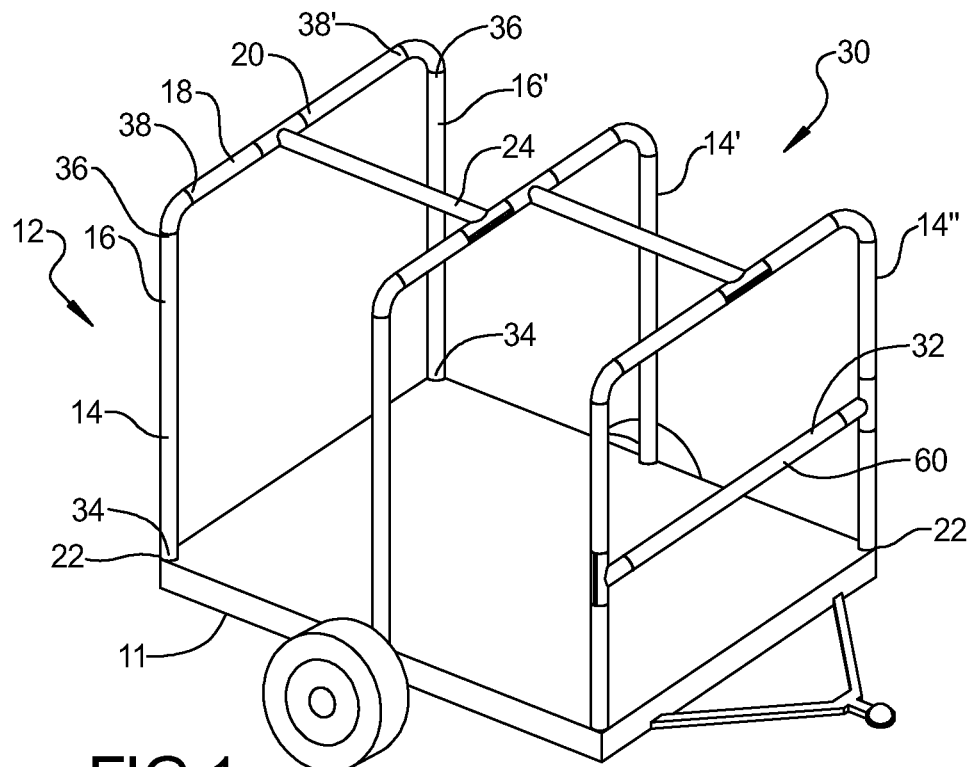
FIG. 1 is a perspective view of a support frame according to a first embodiment of the present invention hereof atop a flatbed utility trailer.
Figure 2:
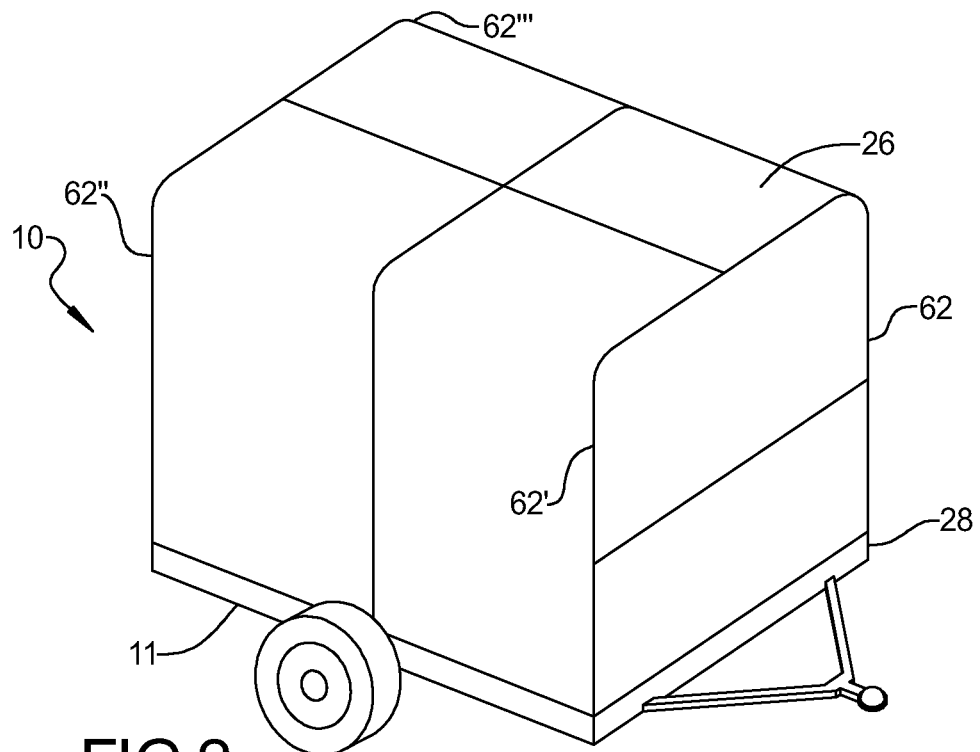
FIG. 2 is a perspective view of the cover assembly according to a first embodiment of the present invention hereof atop a flatbed utility trailer.

In accordance with the present invention and as shown generally in FIGS. 1 and 2, there is provided a cover assembly 10 for enclosing a flatbed 11 which generally comprises: (a) a support structure 12 including a plurality of support assemblies 14,14', etc., each of the support assemblies 14,14', etc. having a pair of opposed support legs 16,16' and a medial portion 18 connected to and extending between each of the support legs 16,16', the medial portion 18 of each support assembly 14,14', etc. having means for adjusting 20 the length of the medial portion 18; (b) means for securing 22 each of the support legs 16,16' to the flatbed 11; (c) at least one cross-member 24 connected to and extending between a first support assembly 14 and a second support assembly 14' from the plurality of support assemblies 14,14', etc.; (d) a covering 26 positioned over the support structure 12; and (e) means for securing 28 the covering 26 to the support structure 12.

A support frame 30 for the cover assembly 12 includes the plurality of support assemblies 14,14', etc. and at least one cross-member 24. The support frame 30 can also include at least one lateral support member 32. The plurality of support assemblies 14,14', etc., the at least one cross-member 24, and the at least one lateral support member 32 when provided) each comprise elongated members, such as bars or tubes. The support frame 30 members can have any suitable cross-sectional shape, such as circular, rectangular, and so forth. In addition, the elongated support frame 30 members can be either hollow or solid. Preferably, the support frame 30 members each comprise an elongated hollow tubular bar. As discussed in further detail below, the support frame 30 members can be formed from any suitable materials including metal, plastic, or wood.

Although the first embodiment comprises a plurality of support assemblies 14,14', etc., for purposes of illustration and clarity, the ensuing description will be made with reference solely to support assembly 14. The support assembly 14 includes a pair of opposed support legs 16,16' and a medial portion 18. Each of the support legs 16,16' has a terminal end 34 and a connector end 36. In addition, the medial portion 18 has a pair of opposed medial connector ends 38,38'. The connector end 36 of each support leg is connected to a respective one of the medial connector ends 38,38' to form the support assembly 14 having a generally inverted U-shaped construction. Each support leg connector end 36 and its associated medial connector end 38,38' are connected by means which are well-known in the art. For instance, they can be of unitary construction and formed from a single elongated curved member, they can be welded together, telescopically secured together (e.g., one of the members is telescopically inserted into the other member; both members are telescopically secured to a curved connection member; etc.), and so forth.

In use, the plurality of support assemblies 14,14', etc. are generally aligned with each other to form a framed structure, as shown in FIG. 1. In addition, when the cover assembly 10 is assembled on the flatbed 11, such as on a utility trailer, the support legs 16,16' from each support assembly 14,14', etc. are preferably located proximal to the edges of the flatbed 11 to maximize the interior space within the cover assembly 10.

In order to allow the plurality of support assemblies 14,14', etc. to be used on flatbeds of varying widths, such as found with industry-standard sizes for utility trailers, each medial portion 18 is provided with means for adjusting 20 the length of the medial portion 18. Because the support legs 16,16' are connected to the medial portion 18, an adjustment in length of the medial portion 18 commensurately adjusts the distance between the opposed support legs 16,16'. The support legs 16,16' and the at least one cross-member 24 can also optionally include the means for adjusting 20 so that the height and distance between support assemblies 14,14', etc. can be adjusted as well.

Figure 3A:
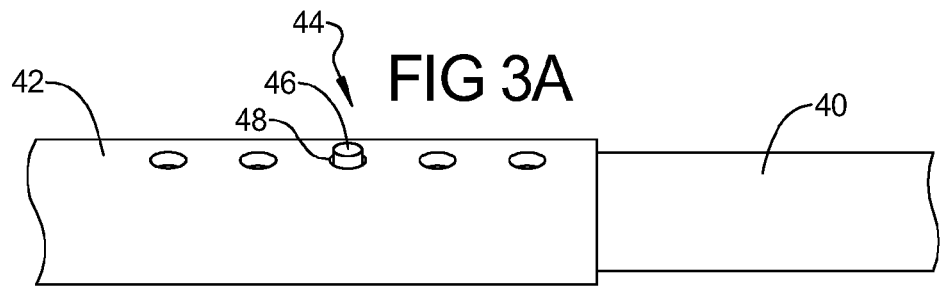
FIGS. 3A-3C are enlarged views of various means for adjusting the length of the medial portion of a support assembly from the plurality of support assemblies.
Figure 3B:
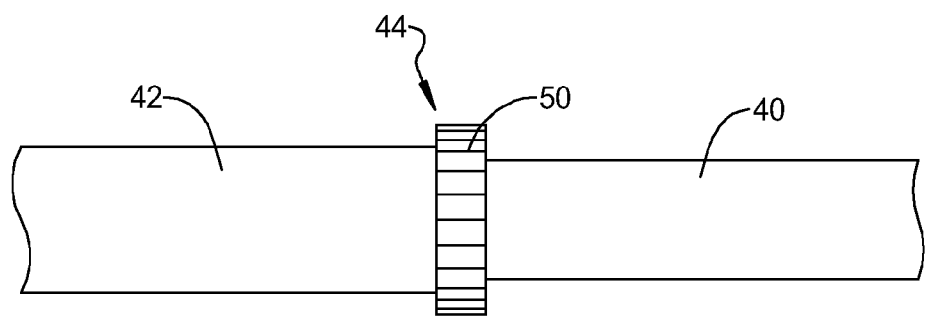
Figure 3C:
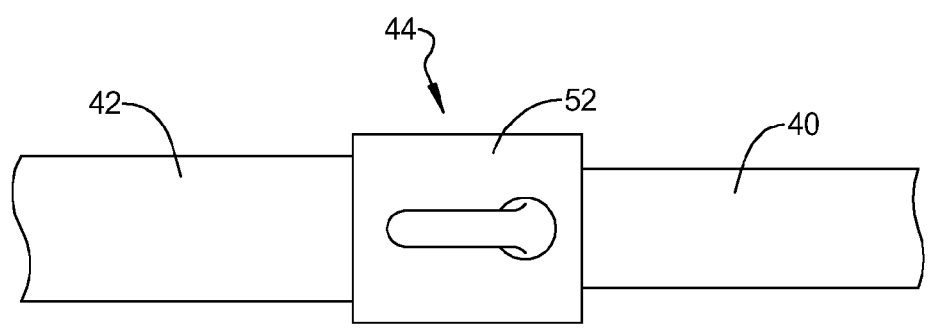

The means for adjusting 20 the length of the medial portion 18 can include any means which are known to one of ordinary skill in the art. FIGS. 3A-3C show exemplary structure for providing the means for adjusting 20. For instance, the medial portion 18 can comprise a first section 40 and a second section 42 which telescopically engage with each other, and means for securing 44 the first section 40 and second section 42 in place with respect to each other. The means for securing 44 can include: a spring-loaded push button 46 which protrudes outwardly from the first section 40 and through a hole 48 in the second section 42, such as generally disclosed in U.S. Pat. No. 5,797,797 to Parsons (see FIG. 3A); a locking collar 50 as generally disclosed in U.S. Pat. No. 4,818,135 to Desjardins or U.S. Pat. No. 4,715,089 to Schema (see FIG. 3B); a collar and lever mechanism 52 such as generally disclosed in U.S. Pat. No. 5,791,805 to Lynch et al. (see FIG. 3C); and so forth. It is to be appreciated that any structure which is well-known to one of ordinary skill in the art for securing telescopic tubes to each other can be used.

Referring now to FIG. 4, means for securing 22 the terminal end 34 of each support leg 16,16' to the flatbed 11 is provided. The means for securing 22 can include providing a base support 54 which is fastened to the flatbed 11 using suitable fasteners and which includes a collar 56 for receiving and securing the terminal end 34 of the support leg 16 therein. Alternatively, the means for securing 22 can include a bored hole (not shown) appropriately located on the flatbed which is dimensioned for inserting the terminal end 34 of each support leg therein, or by affixing the terminal end 34 to the flatbed 11 (not shown), such as by using fasteners (e.g. nuts and bolts). It is to be appreciated by one of ordinary skill in the art that any well-known structure for securing an elongated member to a surface can be used. For ease of installation upon the flatbed 11, it is preferable that the means for securing 22 allows for easy installation and removal by hand without the use of tools.

Referring back to FIG. 1, at least one elongated cross-member 24 is additionally provided to extend between each successively positioned support assembly 14 from the plurality of support assemblies 14,14', etc. Each provided cross-member 24 supplies additional fore-and-aft structural support between the successive support assemblies 14,14', etc., which is particularly important because the cover assembly 10 will experience substantial wind drag forces while traveling at high speeds.

Each end of each cross-member 24 includes means for securement 58 to one of the support assemblies 14,14', etc. The means for securement 58 to one of the support assemblies 14,14', etc. can include fasteners, brackets, and so forth. As shown in FIG. 5, the means for securement 58 preferably provides a strong connection which can be assembled without the use of tools. For example, the means for securement 58 can comprise a fixed-position C-clamp which envelops and partially surrounds a portion of the respective support assembly.

Since the cover assembly 10 is suitable for use at high speeds, additional cross-members (not shown) can be provided as necessary to stabilize each of the support assemblies 14,14', etc. Although only one cross-member 24 need be supplied to brace each successive pair of support assemblies 14,14', etc., at least three cross-members or more can be used for each successive pair of support assemblies 14,14', etc. to provide additional stability. For example, a cross-member 24 can be positioned between each successive row of support legs 16, support legs 16', and medial portion 18 so that a cross-member 24 is supporting both sides and the top of the support structure 12.

Referring back to FIG. 1, the leading support assembly 14, or the first support assembly, from the plurality of support assemblies 14,14', etc. can also comprise at least one lateral support member 32 which is connected to and extending between the respective support legs 16,16' to provide additional structural support against transverse wind forces at the sides of the cover assembly 10. Each lateral support member 32 includes means for adjusting 60 the length of the lateral support member 32, which includes the same structure as that which can be used for the means for adjusting 20 the length of the medial portion 18.

The support structure 12, the means for securing 22 each of the support legs 16,16' to the flatbed 11, the at least one cross-member 24, and the at least one lateral support member 32 can be formed from any suitable type of material which is well-known in the art, such as metal, wood, plastic, or composite materials. Preferably each is formed from a corrosion-resistant material. Even more preferably, they are formed from a corrosion-resistant metal, such as aluminum or galvanized steel. In order to minimize weight, each component can also be formed from any type of composite material which one having ordinary skill in the art would recognize as being suitable for use herewith, such as a polymer-based composite material. This can include any suitable type of polymer resin reinforced with fiberglass, carbon fiber, or the like.

The cover assembly 10 also includes a covering 26 which is mounted over the support structure 12 to protect the items enclosed by the cover assembly 10 from the elements, such as wind, rain, snow, road salt, UV rays, and so forth. The covering 26 can comprise any suitable type of covering, such as being formed from either a flexible material (e.g., a polymeric sheet) or a resilient material (e.g., fiberglass, aluminum, etc.), as discussed in further detail below. For purposes of weight reduction, storage space, and ease of installation, the covering 26 preferably comprises a flexible tear-resistant woven material formed from either a polymer or natural fiber which is coated and/or impregnated with a polymer, such as vinyl-coated polyester. Even more preferably, the covering 26 comprises a woven polyester which is dual-side coated (i.e., coated on each side) with an acrylic coating, such as the type sold under the trademark TOP GUN™.

As shown in FIG. 2, when the covering 26 comprises a flexible material, it is mounted over the top of the support structure 12 and drapes over each side of the support structure 12. The covering 26 can comprise a single sheet of material being generally in the shape of a cross or "+" when folded flat, and includes a plurality of edges 61a,61b, etc., as seen in FIG. 9. Optionally, the covering 26 can comprise a plurality of flexible rectangular sheets or panels which are secured to each other when assembled.

Figure 6:
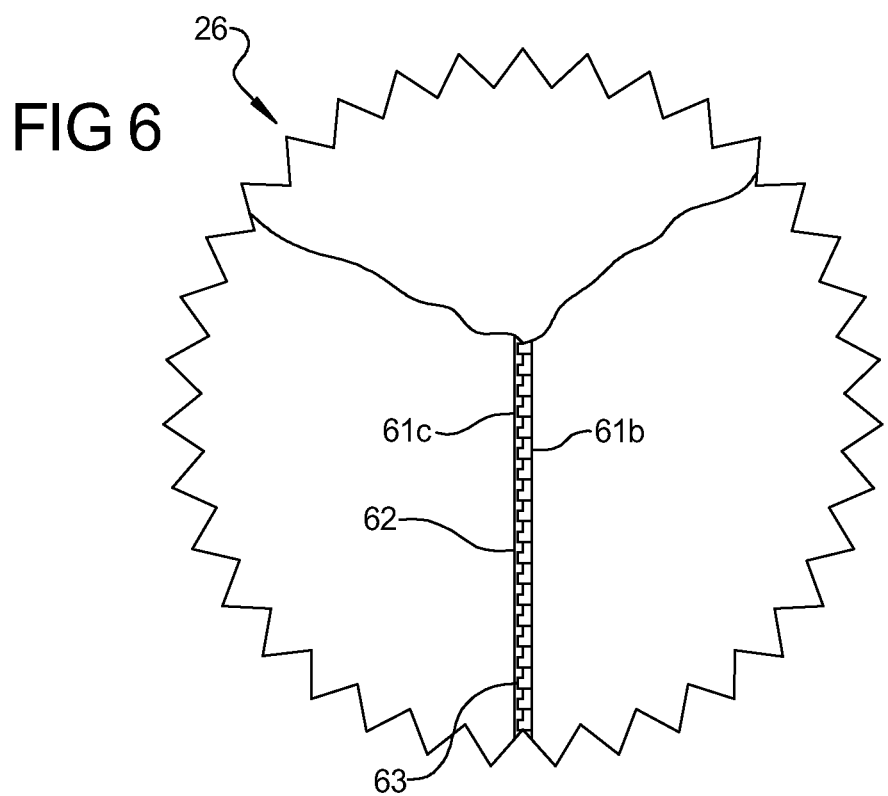
FIG. 6 is an enlarged view of an upper corner of the covering showing a zipper securing adjacent vertical edges of the covering to each other.

Referring now to FIG. 6, in use, each edge from the plurality of edges 61a,61b, etc. adjoins with its respective adjacent edge to form one of the vertical edges 62,62',62",62'" of the flexible covering 26. The vertical edges 62,62',62",62'" are located along the vertical corners of the support frame 30 to form an enclosure atop the flatbed 11.

Means for securing 63 are provided for securing the plurality of edges 61a,61b, etc. to each other. The means for securing 63 can comprise any means which are well-known in the art that are strong, durable, capable of withstanding high wind speeds for extended periods of time, and easy to fasten and release by hand, such as zippers, hook-and-loop fasteners commonly sold under the trademark VELCRO®, and the like.

When the covering 26 comprises a resilient material, the covering can comprise a plurality of panels (not shown) which can be removably secured to the support structure 12 via fasteners. Preferably the edges of the panels form a water-tight barrier with each other to protect the contents of the cover assembly 10 from the outdoor environment.

Figure 7:
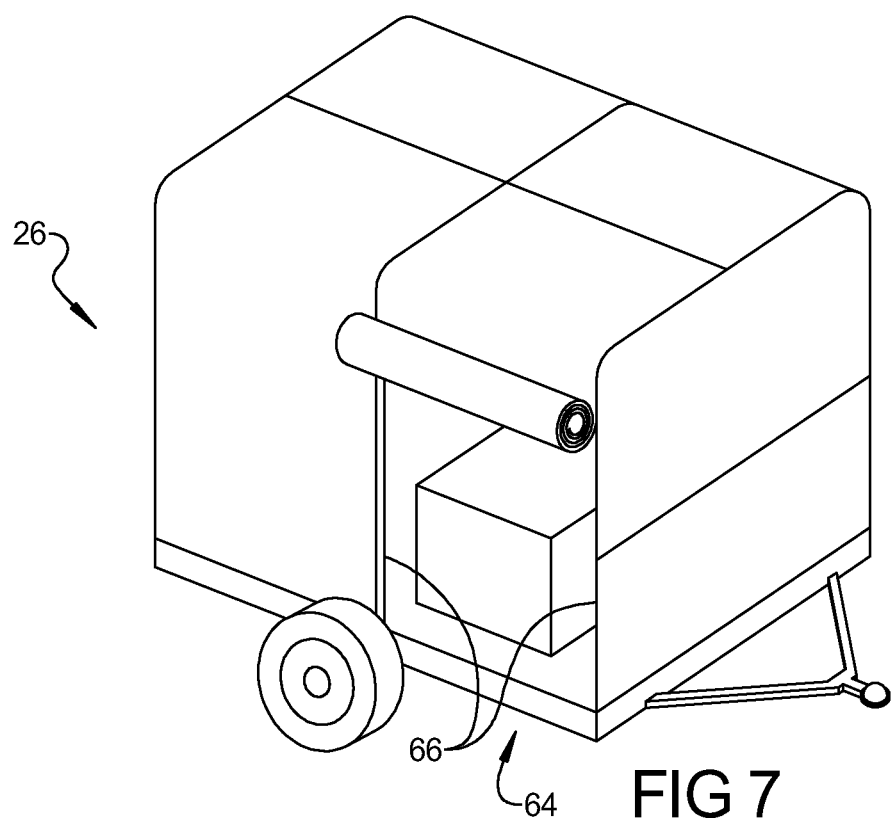
FIG. 7 is a perspective view of the cover assembly showing an exemplary opening along a lateral side thereof for accessing items enclosed within the cover assembly.

As shown in FIG. 7, while loading and unloading the enclosed flatbed 11, it may be desirable to leave at least one side open through which items can be either loaded or unloaded. While the rear side of the flatbed 11 is usually used for loading and unloading, many flatbeds allow loading access at either lateral side as well.

The covering 26 can also include an opening 64 along either or both of the lateral sides to facilitate access to the items enclosed within the cover assembly. When the covering 26 comprises a flexible material, the opening 64 can comprise means for opening and closing 66 the opening, such as a zipper. When the covering 26 comprises a resilient material, the opening 64 can comprise a hinged door or window, or a rollup covering as well. When a resilient door is provided, it can also comprise a plurality of horizontal slats which are rotatably secured to each other so that the door can be opened overhead like a typical garage door. In another aspect, the door can be rolled up upon itself in a manner similar to that generally described in U.S. Pat. No. 5,172,744 to Finch et al.

The opening 64 can be any suitable size which is desirable for use herewith, such as an access panel sized to allow the passage of a gas nozzle, or a large opening to enable a person to pass through to retrieve items from the front section of the flatbed 11. While in use, access to the items along either or both of the lateral sides can be particularly important. For instance, when the cover assembly 10 is relatively long (e.g., 8 feet or more), and the stowed items must be accessed for refueling without unloading the items from the flatbed 11. In such cases, it is important that the items be accessible from either of the lateral sides so that a gas pump nozzle can be passed therethrough.

As shown in FIG. 10, means for securing 28 the covering 26 over the support structure 12 are provided as well. For example, the means for securing 28 can include fasteners 29 attached to the covering 26. The fasteners 29 are of the type which are well-known in the art, such as hook-and-loop fasteners 31 or brackets 33, and they can be used to secure the covering 26 to the support assemblies 14,14', etc. and/or the at least one cross-member 24. In addition, the means for securing 28 the covering 26 over the plurality of support assemblies 14,14', etc. can include grommets (not shown) located along a bottom edge 68 of the covering 26 which engage with hooks (not shown) that are fastened to the flatbed 11.

As shown in an embodiment in FIG. 8, the means for securing 28 the covering 26 can also include the bottom edge 68 of the covering 26 having a rigid member, or bar 72 connected thereto. For instance, the bottom edge 68 of the covering 26 can comprise a closed loop 70 having the bar 72, inserted therethrough. At the end 74 of the bar 72, the bar 72 is releasably secured to the means for securing 22 each of the support legs 16,16' to the flatbed 11. In this embodiment, the end 74 of the bar 72 can include an open-ended bore 76. A compression spring 78 and a pin 80 are inserted into the bore 76. The spring 78 is biased to extend the pin 80 outwardly from the bore 76. The corresponding means for securing 22 the support legs 16,16' to the flatbed 11 includes a transverse shaft 82 extending outwardly from the means for securing 22 and having an open-ended bore 84 which is positioned and dimensioned to accept and retain the extended portion of the pin 80, thereby securing the bottom edge 68 of the covering 26 to the support structure 12. The user can compress the extended pin 80 into the bore 76 to release the bar 72 from the means for securing 22 the support legs 16,16' to the flatbed 11.

The cover assembly 10 can also include storage components (not shown), such as shelves, racks, trays, hooks, and the like, which are secured to the support structure 12 and which provide additional storage space for stowing items. The storage components can be secured to the support structure 12 using any means which are well-known in the art, such as the use of C-clamps described above.

In another aspect, and as shown in FIG. 11, the present invention can include a plurality of boards 86 which are secured between the plurality of support assemblies 14,14', etc. along any of the lateral, front, or rear sides of the cover assembly 10 via slots or rails 88 which are connected to the support legs 16,16'. The plurality of boards 86 can extend the full height of the cover assembly, although they preferably extend only partially upwardly and serve as additional protection to the items stowed on the flatbed 11.

As shown in FIG. 12, in yet another aspect, the means for securing 22 the support structure 12 can comprise ground stakes or other structure which are suitable for use on the ground to allow the cover assembly 10 to be used as a temporary tent or shelter as well. In this embodiment, the means for securing 22 can be ground stakes, adjustable legs, pivotable flat feet, etc.

In use, the cover assembly can be sold as a kit which includes (depending upon the size of the flatbed) the appropriate number of support assemblies, the appropriate number of cross-members, and an appropriately sized covering. Although the covering should be dimensioned for a specific size of flatbed, it is to be appreciated by one having ordinary skill in the art that the support structure can accommodate flatbeds having varying widths by adjusting the length of the medial portions. It is also understood by one having ordinary skill in the art that the successive rows of support assemblies should be positioned approximately four feet apart from each other to provide adequate structural stability to the cover assembly, particularly during high-speed travel. Thus, the length of any given flatbed will determine the number of support assemblies required. Cross-members which are either length-adjustable or custom-sized can also be provided to accommodate for flatbeds having a length which is not evenly divisible into four-feet sections.

It should be understood that the present invention is not limited to the specific aspects described above. The support structure and covering may be made from any number of suitable materials, and the cover assembly may be used to enclose items on any suitable type of open surface.

As is apparent from the preceding, the present invention provides a cover assembly comprising a size-adjustable support structure and a covering for use in enclosing items on a flatbed. The support structure can be modified to fit the size of any flatbed, including any industry-standard size for flatbed trailers. The cover assembly can also be assembled easily, quickly, and without the required use of tools. Therefore, the present invention provides a cover assembly which allows one to convert any basic flatbed into a fully enclosed, customizable, and size-modifiable trailer which can be used for any suitable purpose including transporting equipment or serving as a temporary shelter.

What is claimed is:

1. A cover assembly for enclosing a flatbed which generally comprises:
    a support structure including a plurality of support assemblies, each of the support assemblies having a pair of opposed support legs and a medial portion connected to and extending between each of the support legs, the medial portion of each support assembly having an adjustable length and includes a first section and a second section which telescopically engage with each other, the first section having a spring-loaded push button protruding outwardly therefrom, and the second section having a hole dimensioned to receive the push button;
    means for securing each of the support legs to the flatbed;
    at least one cross-member connected to and extending between a first support assembly and a second support assembly from the plurality of support assemblies, each cross-member includes opposed ends, and each end includes a fixed-position C-clamp which envelops and partially surrounds a portion of a respective one of the support assemblies;
    a covering positioned over the support structure; and
    means for securing the covering to the support structure.

2. The cover assembly of claim 1 wherein the covering comprises a flexible material.

3. The cover assembly of claim 2 wherein the covering comprises a woven polyester dual-side coated with an acrylic coating.

4. The cover assembly of claim 3 wherein the plurality of support assemblies and each cross-member comprises a polymer-based composite material.

5. The cover assembly of claim 2 wherein the plurality of support assemblies and each cross-member comprises a polymer-based composite material.

6. The cover assembly of claim 1 comprising at least one opening for accessing an interior of the cover assembly, wherein at least one of the openings is located on a lateral side of the flatbed.

7. The cover assembly of claim 6 wherein the means for securing each of the support legs to the flatbed comprises a base support fastened to the flatbed and a collar for receiving and securing a terminal end of one of the support legs, and the means for securing the covering to the support structure includes a rigid member connected to a bottom edge of the covering and a transverse shaft having an open-ended bore extending outwardly from the base support, the transverse shaft and open-ended bore being positioned and dimensioned to accept and retain an end of the rigid member.

8. The cover assembly of claim 7 wherein the covering comprises a woven polyester dual-side coated with an acrylic coating.

9. The cover assembly of claim 7 wherein the plurality of support assemblies and each cross-member comprises a polymer-based composite material.

10. The cover assembly of claim 1 wherein the means for securing each of the support legs to the flatbed comprises a base support fastened to the flatbed and a collar for receiving and securing a terminal end of one of the support legs, and the means for securing the covering to the support structure includes a rigid member connected to a bottom edge of the covering and a transverse shaft having an open-ended bore extending outwardly from the base support, the transverse shaft and open-ended bore being positioned and dimensioned to accept and retain an end of the rigid member.

11. The cover assembly of claim 10 wherein the means for securing the covering to the support structure further includes at least one fastener secured to the covering which retains a portion of one of the support assemblies.

12. The cover assembly of claim 6 wherein the covering comprises a woven polyester dual-side coated with an acrylic coating.

13. The cover assembly of claim 12 wherein the plurality of support assemblies and each cross-member comprises a polymer-based composite material.

14. The cover assembly of claim 6 wherein the plurality of support assemblies and each cross-member comprises a polymer-based composite material.

15. The cover assembly of claim 7 wherein each base support in a pair of adjacent base supports includes a set of rails, and the cover assembly further includes a board positioned between the rails and extending between the pair of adjacent base supports.

* * * * *